United States Patent [19]
Katzman

[11] Patent Number: 6,105,608
[45] Date of Patent: Aug. 22, 2000

[54] GAS PURGE VALVE

[75] Inventor: Yuval Katzman, Zichron Yaacov, Israel

[73] Assignee: A.R.I. Kfar Charuv, Kamat Hagolan, Israel

[21] Appl. No.: 09/182,324

[22] Filed: Oct. 30, 1998

Related U.S. Application Data

[63] Continuation-in-part of application No. 08/881,201, Jun. 24, 1997, abandoned, which is a continuation-in-part of application No. 08/726,411, Oct. 3, 1996, abandoned.

[51] Int. Cl.[7] .................................................. F16K 31/12
[52] U.S. Cl. ...................... 137/491; 137/493.9; 137/490; 137/202; 251/35
[58] Field of Search ............................... 137/202, 493.9, 137/493, 491, 490, 449; 251/35

[56] References Cited

U.S. PATENT DOCUMENTS

| | | |
|---|---|---|
| 2,078,997 | 5/1937 | Berger . |
| 2,224,394 | 12/1940 | Jurs . |
| 2,576,516 | 11/1951 | Jurs . |
| 2,869,577 | 1/1959 | Koehler . |
| 3,011,515 | 12/1961 | Kravagna . |
| 3,055,629 | 9/1962 | Jurs et al. . |
| 3,100,502 | 8/1963 | Ford et al. . |
| 3,307,575 | 3/1967 | Dickinson et al. . |
| 3,502,297 | 3/1970 | Wardrup .................................. 251/61.1 |
| 3,592,224 | 7/1971 | Bois ........................................ 137/492 |
| 3,712,578 | 1/1973 | Dawson . |
| 3,922,111 | 11/1975 | Deters . |
| 3,968,897 | 7/1976 | Rodgers . |
| 4,052,965 | 10/1977 | Morris . |
| 4,057,076 | 11/1977 | Varis et al. . |
| 4,148,336 | 4/1979 | Leinemann . |
| 4,312,375 | 1/1982 | Leinemann . |
| 4,770,201 | 9/1988 | Zakai . |
| 5,449,018 | 9/1995 | Harris . |

FOREIGN PATENT DOCUMENTS

| | | |
|---|---|---|
| 2 042 327 | 3/1971 | Denmark . |
| 35178 | 8/1970 | Israel . |
| 79587 | 8/1986 | Israel . |
| 870882 | 6/1961 | United Kingdom . |

Primary Examiner—Denise L. Ferensic
Assistant Examiner—Joanne Y. Kim
Attorney, Agent, or Firm—Oliff & Berridge, PLC

[57] ABSTRACT

A gas purge valve comprising a valve housing that has a valve inlet and major and minor valve outlets, a valve partition mounted in the housing divides the housing into a first chamber communicating with the valve inlet and a second chamber that communicates with the minor valve outlet. A restrictive flow passage is defined in the housing that effects communication between the first and second chambers and has a through flow rate less than that of the minor valve outlet. A minor valve closure device is provided for closing the minor valve outlet to liquid outflow. A differential pressure responsive device mounted in the partition member and displaceable in response to a pressure differential between the chambers and a major valve outlet obturating device responsive to displacement of the differential pressure responsive device into the opening of the major valve outlet when the pressure differential exceeds a predetermined magnitude.

19 Claims, 15 Drawing Sheets

GAS PURGE VALVE

CROSS REFERENCE TO RELATED APPLICATION

This application is a continuation-in-part of Ser. No. 08/881,201 filed Jun. 24, 1997 now abandoned, which is a continuation-in-part of Ser. No. 08/726,411 filed Oct. 3, 1996 now abandoned.

FIELD OF THE INVENTION

The present invention is in the field of fluid flow valves and is particularly, but not exclusively, concerned with such valves which are designed to serve as gas discharge valves or gas purge valves.

BACKGROUND OF THE INVENTION

Air purge valves are designed to be installed in liquid flow systems such as, for example, water main distribution lines or sewage collection systems, or liquid tanks, and are intended to discharge air (typically in water supply systems) or other gasses (e.g. in sewage systems), thus avoiding the formation and accumulation of gas pockets and bubbles which interfere with the liquid flow and which can also damage accessories and components of the liquid system.

A basic requirement for such gas purge valves is their ability to discharge effectively and rapidly both large and small quantities of gas whilst, at the same time, being or becoming sealed against liquid discharge. Conventional air purge valves are formed with a gas discharge outlet through which the gasses are discharged but which become sealed against liquid discharge by a float located in a valve housing and which becomes pressed against the outlet so as to seal it with a rising level of liquid in the valve housing. Such a valve, when provided with a relatively small discharge outlet, is effective for the discharge of small quantities of gas but cannot cope where large quantities have to be discharged. Where, however, in order to render the valve capable of handling large quantities of gas it is provided with a large discharge outlet (and, consequently, a large dimensioned float), problems arise in order to ensure that the valve can readily discharge rapidly relatively small quantities of gas after the discharge outlet has been sealed against liquid outflow. Thus, once the valve housing is filled with liquid and the float has been pressed against the relatively large outlet so as to seal it, the valve will only reopen once the pressure in the housing has dropped to atmospheric pressure and, in consequence, such a valve cannot be used for the continuous venting of relatively small amounts of air. Moreover, such valves have the drawback of being substantially sensitive to the presence of grit, etc., particularly where manufacturing tolerances or erosion of various components, etc., greatly influence the behavior of the float and its response to changes of the fluid flowing therethrough (liquid or gas). Thus performances of such air purge valves are somewhat inaccurate and may malfunction.

Another drawback of such air purge valves is that they tend to give rise to so-called "hammering" in the liquid system.

In particular, such gas purge valves are substantially bulky, heavy and expensive.

Proposals have also been made for gas purge valves capable of effectively and rapidly discharging both relatively small and large quantities of gas. Such a proposal is to be found in U.S. Pat. No. 4,770,201 wherein a float operated membrane is employed to open or seal successive outlet aperture regions. Such an arrangement, whilst allowing for the effective and speedy opening of the outlet aperture for speedy discharge of relatively small quantities of gas as well as its complete opening for the discharge of large quantities, is nevertheless subject to size restrictions which inherently restrict its use where large quantity discharge has to be provided for.

It is therefore an object of the present invention to provide a new and improved gas purge valve in which the above-referred-to disadvantages are substantially reduced or overcome.

SUMMARY OF THE INVENTION

According to the present invention, there is provided a gas purge valve comprising a valve housing having a valve inlet and major and minor valve outlets; a valve partition member mounted in said housing and serving to divide said housing into a first chamber communicating with said valve inlet and a second chamber communicating with said minor valve outlet; a flow passage defined in said housing serving to effect communication between said first and second chambers and having a throughflow rate less than that of said minor valve outlet; a minor valve closure device for closing said minor valve outlet to liquid outflow; differential pressure responsive means mounted in said partition member and displaceable in response to a pressure differential between said chambers and a major valve outlet obturating means responsive to displacement of said differential pressure responsive means into opening said major valve outlet when said pressure differential exceeds a predetermined magnitude.

Preferably, the valve partition member is constituted by a diaphragm, flexibly mounted in the valve housing, at least a portion of which constitutes the differential pressure means. In accordance with a preferred embodiment of the invention, a throughgoing aperture formed in the diaphragm constitutes the flow passage whilst the diaphragm itself serves as the obturating means and is juxtaposed with respect to the major valve outlet so as to bear normally against it, so as to seal it and to be flexibly displaceable away from it so as to open it.

Thus, when the gas purge valve is coupled to a liquid flow system which is to be purged of occluded gasses, the second chamber is initially at atmospheric pressure (being vented via the open minor valve outlet). Small quantities of gas passing from the first chamber to the second chamber via the restricted flow passage are readily vented through the open minor valve outlet without significantly disturbing the differential pressure in the chambers and, in consequence, without giving rise to displacement of the diaphragm so as to open the major valve outlet. If now significant quantities of gas pass from the liquid flow system into the first chamber, and via the flow passage into the second chamber, the fact that the throughflow rate of the flow passage is less than that of the minor valve outlet results in the pressure in the second chamber falling below that in the first chamber, and the differential pressure thus generated acts on the diaphragm so as to displaceably flex into opening the major valve outlet, allowing for the effective venting of the gasses.

If, however, at any time liquid enters the valve so as to pass into the second chamber, the minor valve closure device is activated so as to close the minor valve outlet to outflow of liquid. At the same time, of course, the closure of the minor valve outlet carries with it the consequence that the differential pressure acting on the diaphragm is reduced or eliminated, with the consequence that the major valve outlet is sealed by the diaphragm against liquid discharge.

Preferably, the minor valve closure device is constituted by a float located in a minor valve outlet casing forming part of the minor valve outlet and mounted on the valve housing. The casing is formed with first and second float seatings respectively defining first and second throughflow ports respectively opening to the atmosphere and to the second chamber, at least the first float seating being such that when the float bears against it, the associated throughflow port is sealed against fluid throughflow from the other throughflow port via the casing.

Thus, when the valve is to be used exclusively as a gas purge valve, the second float seating is so designed that when the float bears against it there are preferably defined between the float and the second float seating throughflow passages allowing for the ready flow of relatively small gas quantities from the chamber through the minor valve outlet.

The gas purge valve in accordance with the invention can be readily modified so as to serve additionally as an air inflow valve for flow of air into the flow system when the latter is being drained of liquid and so as to avoid the generation of sub-atmospheric pressures in the system which could lead to its damage. To this end, the casing is so formed that the second float seating is such that when the float bears against it, the second flow port is sealed against fluid flow from the first throughflow port via the casing. Thus, with this modified valve, and upon drainage of the system, a sub-atmospheric pressure is created successively in the first and second chambers (seeing that the seating of the float against the second float seating prevents air flow into the second chamber). As a consequence, the atmospheric pressure bearing on the underside of the diaphragm via the main valve outlet causes the diaphragm to flex into opening the main valve outlet to inflow of air through the valve and into the system.

The valve so modified can nevertheless continue to operate as an air purge valve, seeing that even the flow of small quantities of air into the valve housing is sufficient to lift the float from off its second float seating, allowing for gas discharge through the minor valve outlet.

Preferably, the diaphragm is formed integrally with a tubular skirt, one end of which extends from the diaphragm aperture and an opposite end of which extends into the first chamber. By virtue of this arrangement, the diaphragm experiences a relatively high pressure differential arising out of the relatively low pressure in the second chamber and the relatively high pressure in the downstream region in the first chamber in which the opposite end of the tubular skirt is located, thereby ensuring an effective opening of the main valve outlet. Similarly, when the valve is to be used as an air inflow valve, the location of the opposite end of the tubular skirt in the downstream end of the first chamber (where the lowest air pressures are to be found) ensures the effective opening of the main valve outlet.

A particular embodiment of the gas purge valve in accordance with the invention allows for its effective use in venting a sewage flow system from gasses discharged therefrom, whilst preventing discharge of sewage through the valve. To this end, there is provided a float member located in the first chamber so as to float on liquid sewage therein, the float being coupled to the minor valve closure device for closing the minor valve outlet to liquid throughflow. Gas discharge from the valve takes place as in the preceding described embodiments but in this arrangement it is ensured that the minor valve outlet is sealed to liquid throughflow before the liquid sewage has even entered the second chamber.

BRIEF DESCRIPTION OF THE DRAWINGS

Various embodiments of gas purge valves in accordance with the invention will now be described by way of example and with reference to the accompanying drawings, in which.

DETAILED DESCRIPTION OF VARIOUS EMBODIMENTS IN ACCORDANCE WITH THE INVENTION

Figure 1:
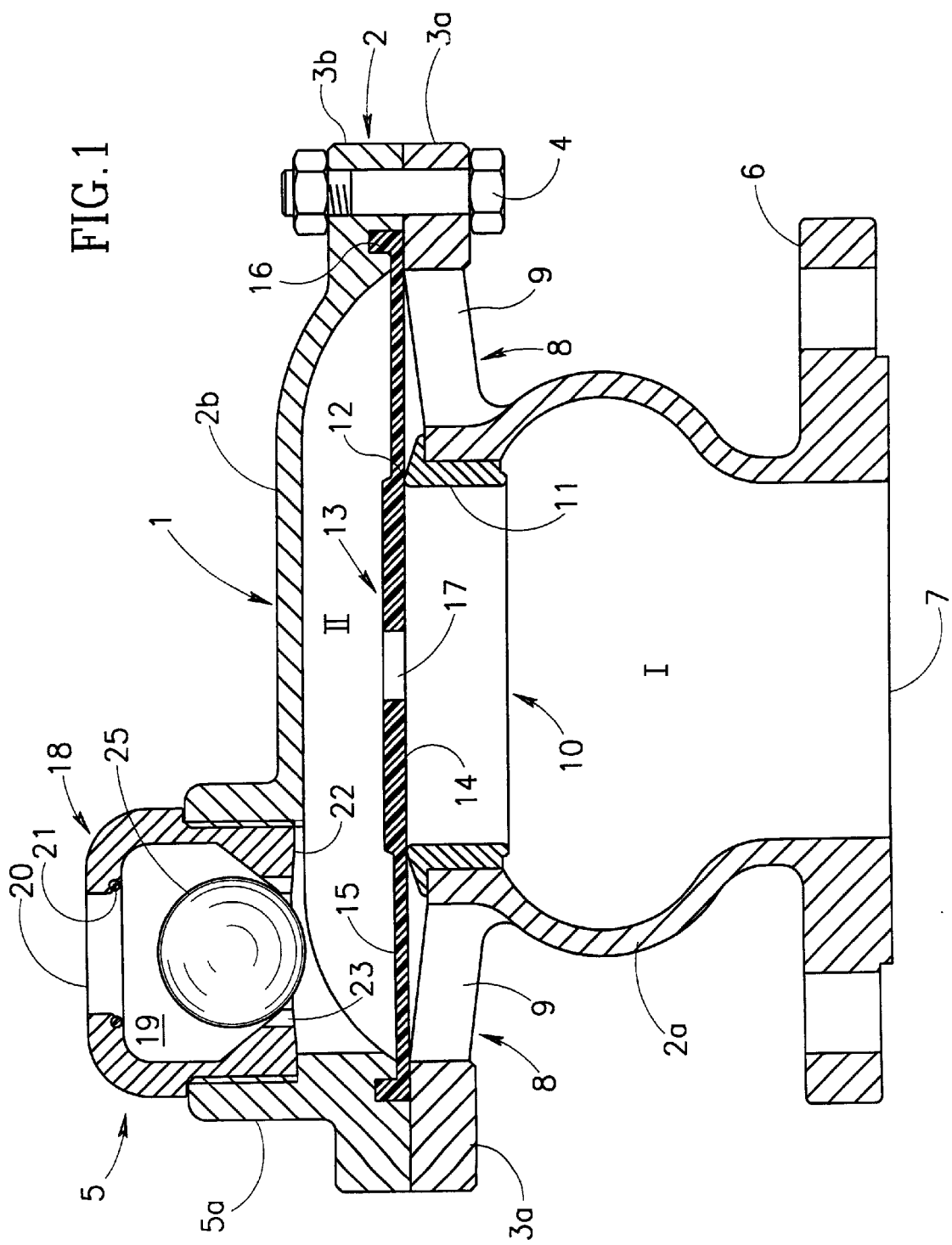
FIGS. 1, 2 and 3 are longitudinally sectioned elevations of a gas purge valve shown respectively in three successive stages of operation.
Figure 2:
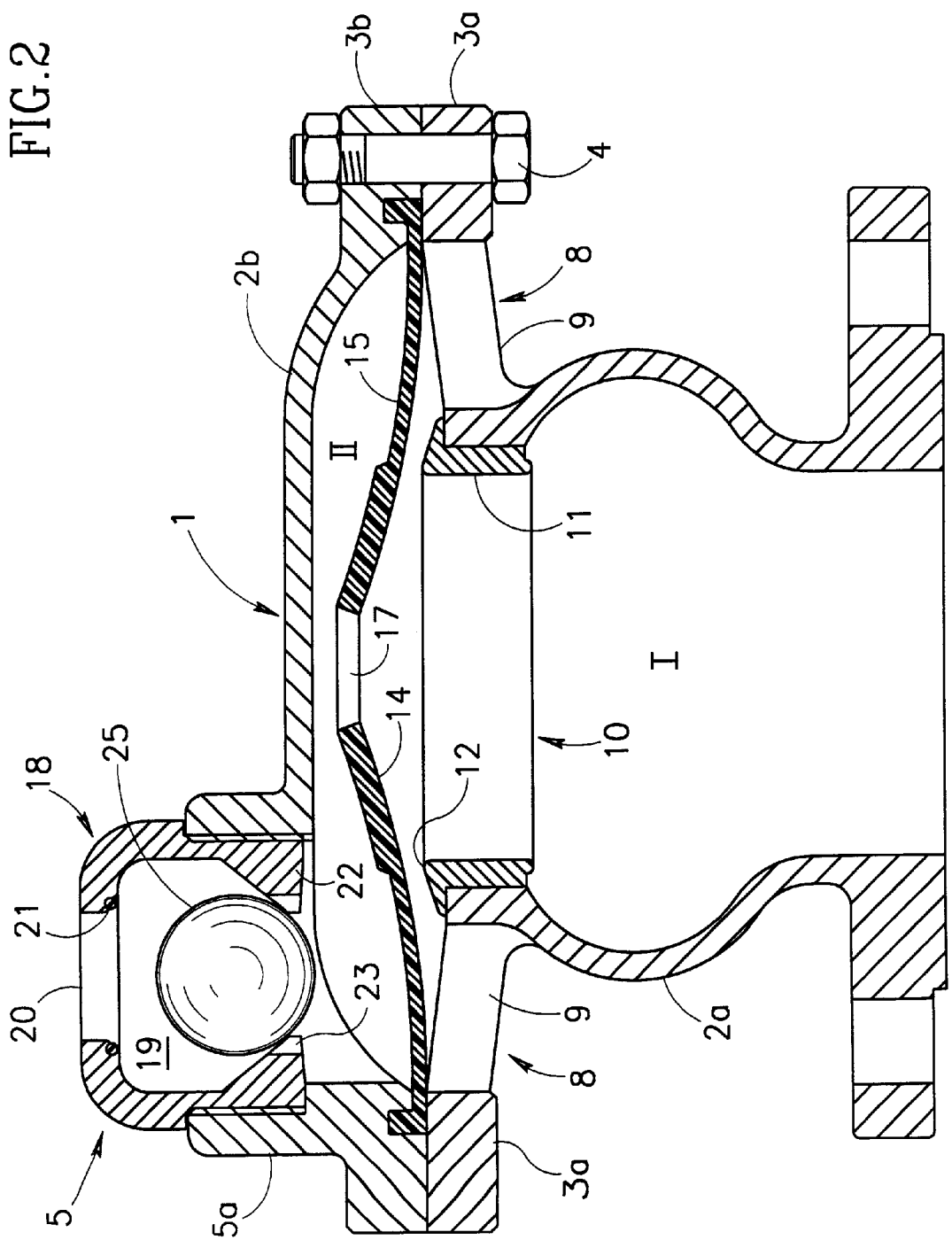
Figure 3:
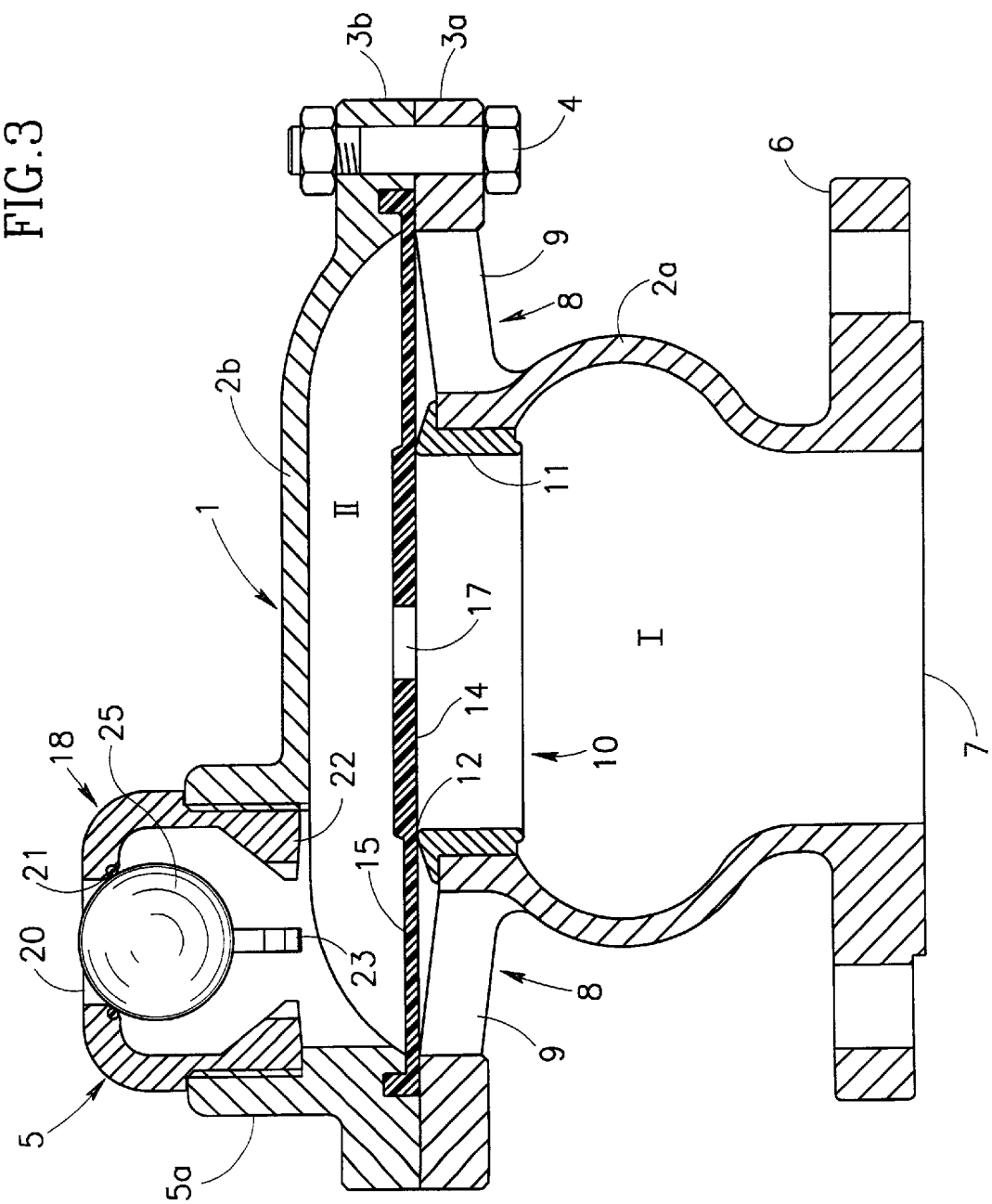

As seen in FIGS. 1, 2 and 3 of the drawings, a gas purge valve 1 comprises a 2-piece valve housing 2, lower and upper housing components 2a and 2b thereof being rigidly and sealingly coupled together at their juxtaposed, respective peripheral flanges 3a, 3b by means of coupling bolts 4.

The upper housing component 2b is formed with a minor valve outlet 5 having an internally threaded boss 5a. The lower valve housing component 2a is formed with a peripheral coupling flange 6 which defines a valve inlet 7 and which is designed for coupling to a liquid flow system (not shown). The housing component 2a is furthermore formed with an annular major valve outlet 8 surrounded by the coupling flange 3a, and provided with radially extending supporting ribs 9.

The housing component 2a is furthermore formed with a cylindrical throughflow port 10 which is fitted with a cylindrical insert 11 having an upper apical portion thereof constituting a diaphragm valve seating 12.

A diaphragm 13 comprising a central, relatively rigid portion 14, surrounded by an integrally formed flexible annular portion 15, is mounted within the valve housing 2 so as to serve as a valve partition member. A peripheral flanged portion 16 of the membrane 13 is firmly clamped between the flanges 3a and 3b of the valve housing 2. The diaphragm 13 serves to divide the valve housing 2 into a lower first chamber I and an upper, second chamber II. A central aperture 17 is formed in the relatively rigid central portion 14 of the diaphragm 13 and serves as a flow passage.

Screw fitted into the minor outlet boss Sa is a minor valve outlet casing 18 which defines an essentially cylindrical enclosure 19 having an upper minor outlet port 20 provided with a peripheral ring seating 21. The minor outlet valve casing 18 is furthermore formed with an inwardly directed peripheral flange 22, from which extend inwardly and radially support ribs 23 which define between them outflow passages 24.

A spherical float 25 is located within the minor outlet valve casing 18. When the float 25 rests on the support ribs 23 constituting a second float seating, as shown in FIG. 1 of the drawings, fluid flow can take place via the outflow passages 24. When, however, and for reasons to be explained below, the float 25 is urged upwardly against the ring seating 21 constituting a first float seating, fluid flow out of the valve 1 through the minor valve outlet 5 is prevented. Furthermore, it will be noted that the throughflow dimensions of the central aperture 17 of the diaphragm 13 are less than those of the minor valve outlet 5 and in this way the throughflow rate of the flow passage is less than that of the minor valve outlet 5.

As can be seen in FIG. 1 of the drawings, the central, relatively rigid portion 14 of the diaphragm 13 rests, at its periphery, on the valve seating 12 and in this way, the annular flexible portion 15 of the diaphragm 13 serves effectively to obturate the annular major valve outlet 8.

In use, and with the purge valve 1 coupled to a liquid flow system (not shown), the second chamber II is normally at atmospheric pressure (being in communication with the atmosphere via the open minor outlet valve 5) and this atmospheric pressure, bearing on the upper surface of the diaphragm 13, serves to keep the latter in sealing contact with the valve seating 12, thus serving as a major valve outlet obturating device sealing the major valve outlet 8.

When air starts to flow from the flow system (not shown) into the lower chamber I, the air will pass therefrom into the upper chamber II via the aperture 17 and out of the minor valve outlet 5 via the outflow passages 24. In this way, relatively small quantities of air can be rapidly discharged through the minor valve outlet 5.

With the continued flow of air from the lower chamber I into the upper chamber II and out of the minor valve outlet 5, and as a consequence of the fact that the throughflow dimensions of the central aperture 17 are less than the throughflow dimensions of the minor valve outlet 5, the pressure in the upper chamber II will fall as compared with the pressure in the lower chamber I. As a consequence, the diaphragm 13, serving as a differential pressure responsive means, will flex upwardly into the position shown in FIG. 2 of the drawings (in view of the greater upwardly-directed pressure exerted on the lower face of the diaphragm 13), thereby unsealing the major valve outlet 8 for air outflow. In this condition, the valve 1 is capable of dealing with outflow of relatively major quantities of air through the relatively large dimensioned major valve outlet 8.

If now liquid enters the valve 1 through the valve inlet 7, the flow of liquid through the lower chamber I into the upper chamber II via the aperture 17 results in the spherical float 25 floating upwardly on the rising liquid until it reaches its uppermost position as seen in FIG. 3 of the drawings, whereupon it is seated against the ring seating 21, preventing the outflow of liquid from the minor valve outlet 5.

It is clear that when the valve 1 (i.e. both the chambers I and II) is full of liquid, as shown in FIG. 3 of the drawings, and the latter cannot escape from the minor valve outlet 5, which is now sealed by the upwardly-positioned spherical float 25, the diaphragm 13 assumes its unflexed sealing position, thereby preventing liquid outflow through the major valve outlet 8.

Thus, the operation of the embodiment of the air purge valve 1, as shown in FIGS. 1 to 3 of the drawings, is in effect that of a relatively simple diaphragm valve having a relatively large-dimensioned major outlet 8 for the rapid purging of large quantities of air. In this case, however, the operation of the diaphragm 13 is controlled by what is essentially a pilot valve which is effective in rapidly purging the system of small quantities of air and reacting immediately to the presence of liquid so as to prevent outflow of liquid therefrom.

Figure 4:
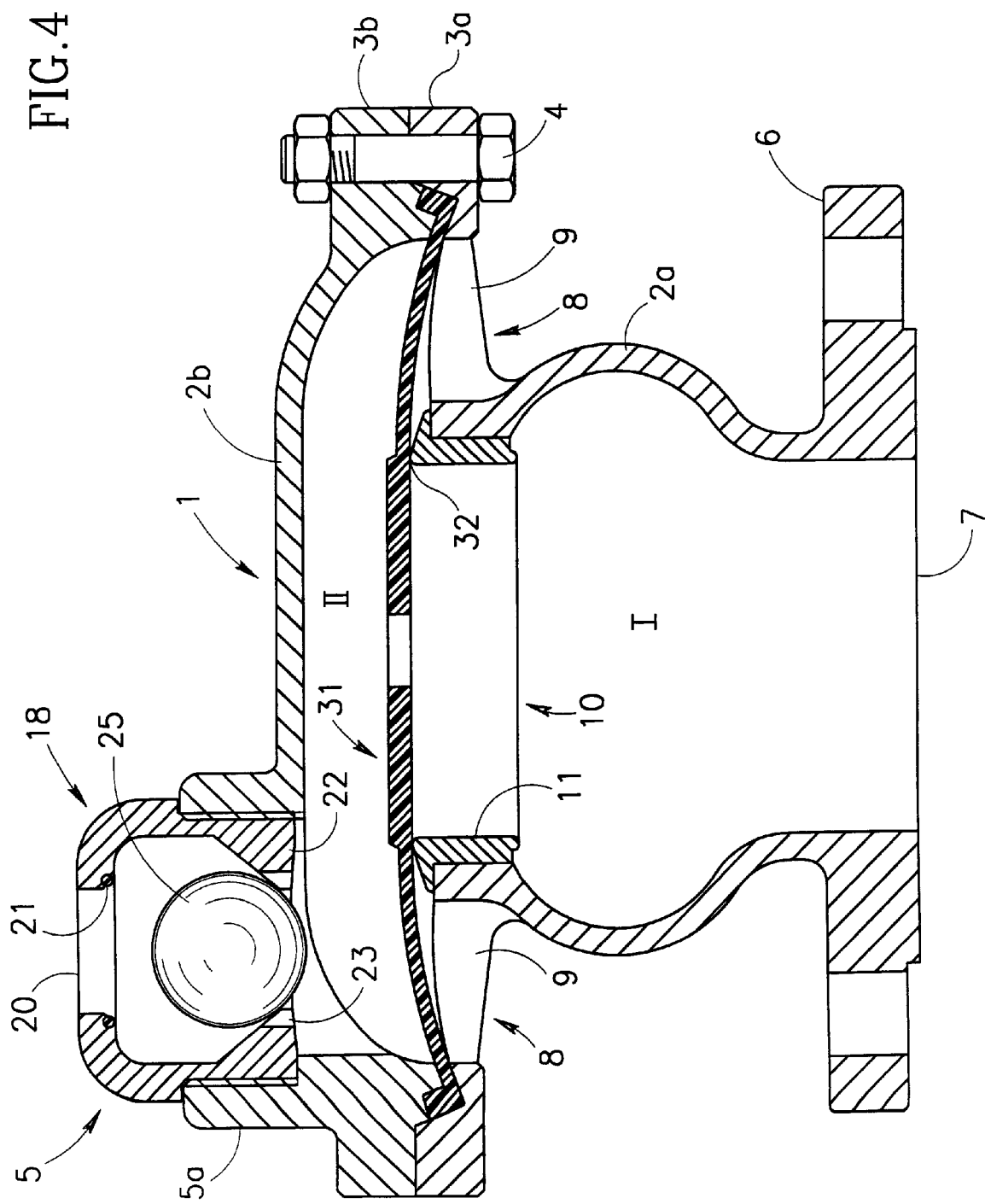
FIGS. 4, 5, 6 and 7 are longitudinally sectioned elevations of respectively modified embodiments of the gas purge valve shown in FIGS. 1, 2 and 3.

FIG. 4 shows a modification of the air purge valve previously described and illustrated therein. In this embodiment, the structure and operation of the air purge valve are essentially similar to that shown in FIGS. 1 to 3, but in this case the mode of clamping of a diaphragm 31, and its location vis-a-vis a valve seating 32, is such as to introduce a degree of pretensioning into the diaphragm 31. This ensures that a relatively high pressure differential must be established between the upper and lower chambers I and II before the diaphragm 31 flexes upwardly in order to open the main valve outlet for throughflow of air. Such an arrangement also ensures the rapid and effective return of the diaphragm 31 into its sealing position, thereby minimizing any initial liquid outflow through the main outlet 8.

Figure 5:
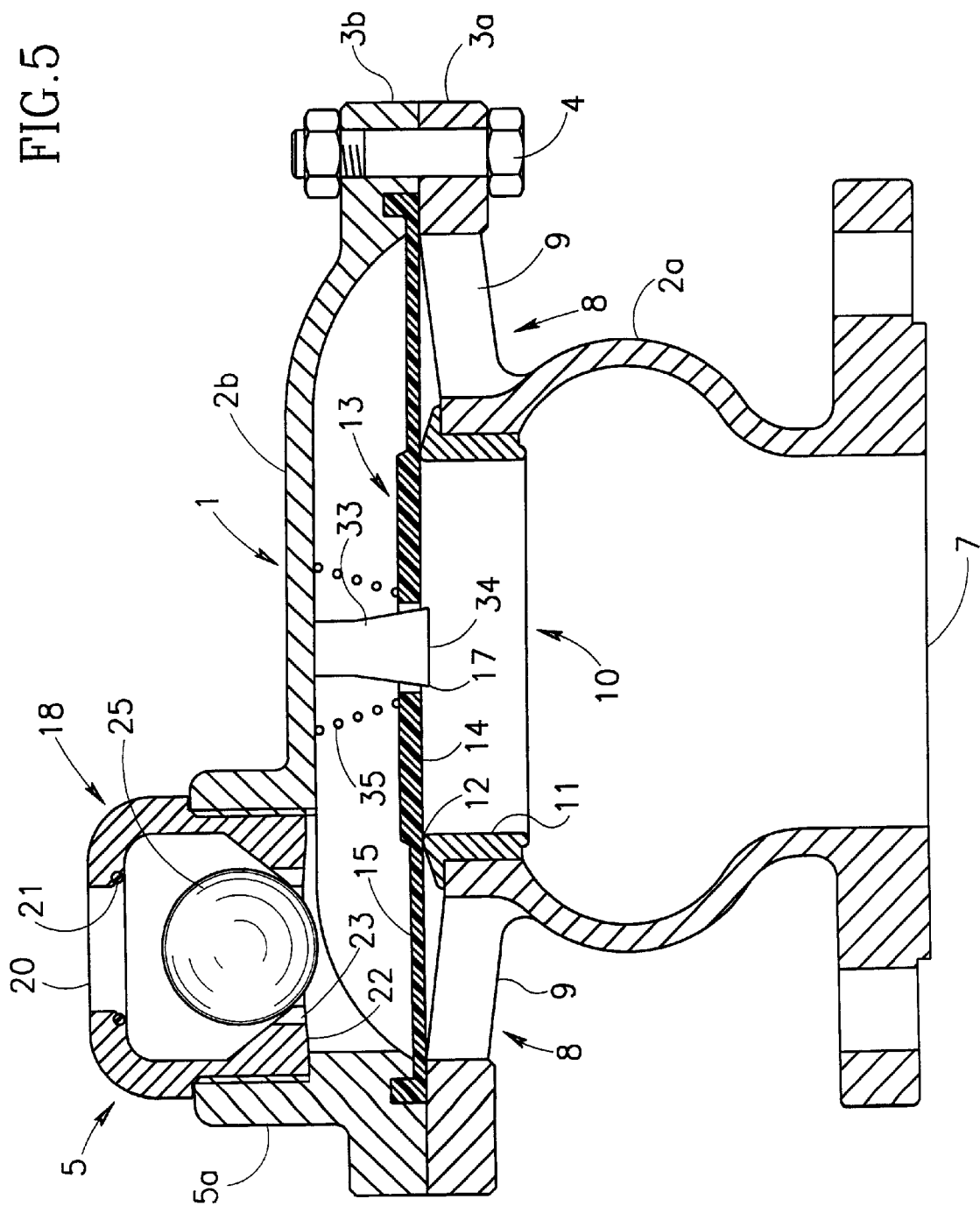

In the embodiment of the valve shown in FIG. 5 of the drawings, there extends downwardly from the upper wall of the upper component housing 2b and into the central throughflow aperture 17 of the diaphragm 13, a throughflow aperture regulating stem 33 which tapers upwardly from its lowermost end 34 located within the aperture 17.

The provision of this stem 33 ensures that, after upward flexing of the diaphragm 13 so as to open the main outlet 8 and the effective discharge of air, the return of the diaphragm 13 to its sealing position takes place only gradually with the progressive reduction of the effective throughflow dimensions of the aperture 17. This controlled return movement of the diaphragm 13 into its sealing position is effective for reducing the generation of shock waves ("hammering") in the system.

Additionally, in the embodiment shown in FIG. 5 of the drawings, a coiled compression spring 35 surrounds the stem 33 and bears downwardly on the diaphragm 13, thereby biasing the diaphragm 13 against opening the main outlet 8. In consequence, the pressure difference which has to be generated between the upper and lower chambers I and II so as to result in the upward flexing of the diaphragm 13 and the opening of the main valve outlet 8 is thereby increased. The provision of the compression spring 35, either as shown surrounding the stem 33 or in an embodiment without such a stem, is effective in preventing or reducing undesirable "hammering" in the system.

Figure 6:
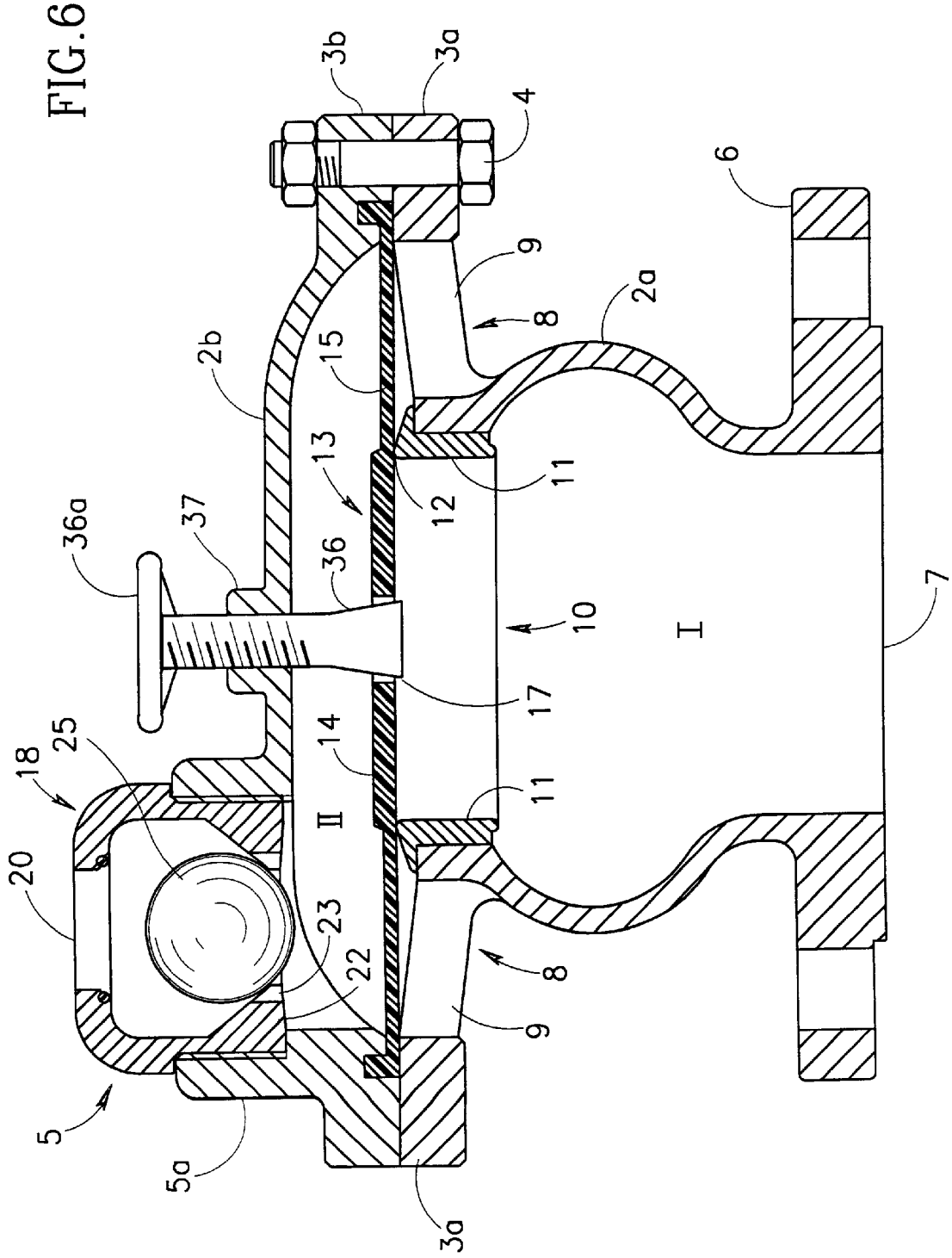

In the embodiment shown in FIG. 6 of the drawings, a tapering aperture regulating stem 36 is again provided for the purpose as indicated above, but in this case the axial position of the stem 36 can be adjusted from outside by rotation of a stem handle 36a, seeing that it is screw-fitted into a corresponding screw-threaded boss 37 formed in the upper wall of the upper component housing 2b. This allows for the obtaining of differing rates of return of the diaphragm 13 to its unflexed sealing position, in accordance with the axial position of the stem 36. In this way, undesirable "hammering" is avoided or reduced.

Whilst the regulating stem 36 has been shown as having a uniform axial taper, it can equally well have other forms of axially directed varying cross-sectional area such as, for example, a stepped shape.

In the embodiment shown in FIG. 7 of the drawings, the air purge valve, which otherwise is identical in construction with the valve illustrated and described with reference to FIGS. 1, 2 and 3 of the drawings, is additionally provided with a small, automatic air purge valve 38 which can be of conventional construction, and which is intended for substantially instantaneous discharge of small quantities of air in any air pressure situation in the second chamber, the minor outlet valve being only operational for air discharge when it is open to the atmosphere for venting.

Such an automatic air purge valve may, for example, be of the kind described in prior U.S. Pat. No. 4,770,201, in which case it could, where appropriate, be used instead of and not in addition to the provision of the minor valve outlet housing 18.

Figure 7:
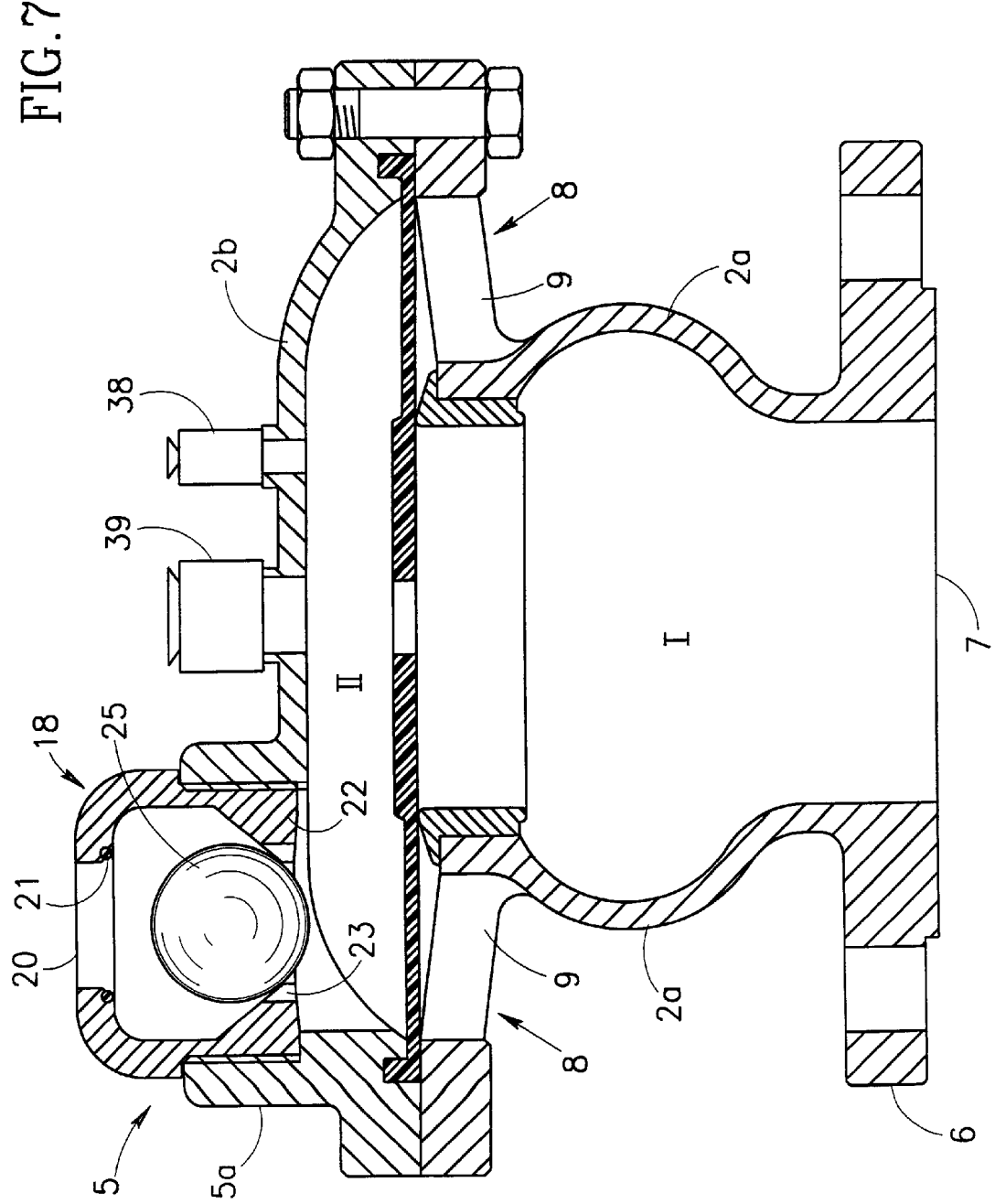

Furthermore, and as shown in FIG. 7 of the drawings, the upper chamber II is provided with a liquid relief valve 39 designed to ensure discharge of liquid from the system when its pressure exceeds a predetermined minimum. In this situation, the diaphragm 13 will also flex upwardly so as to allow for the liquid discharge from the main valve outlet.

Figure 8:
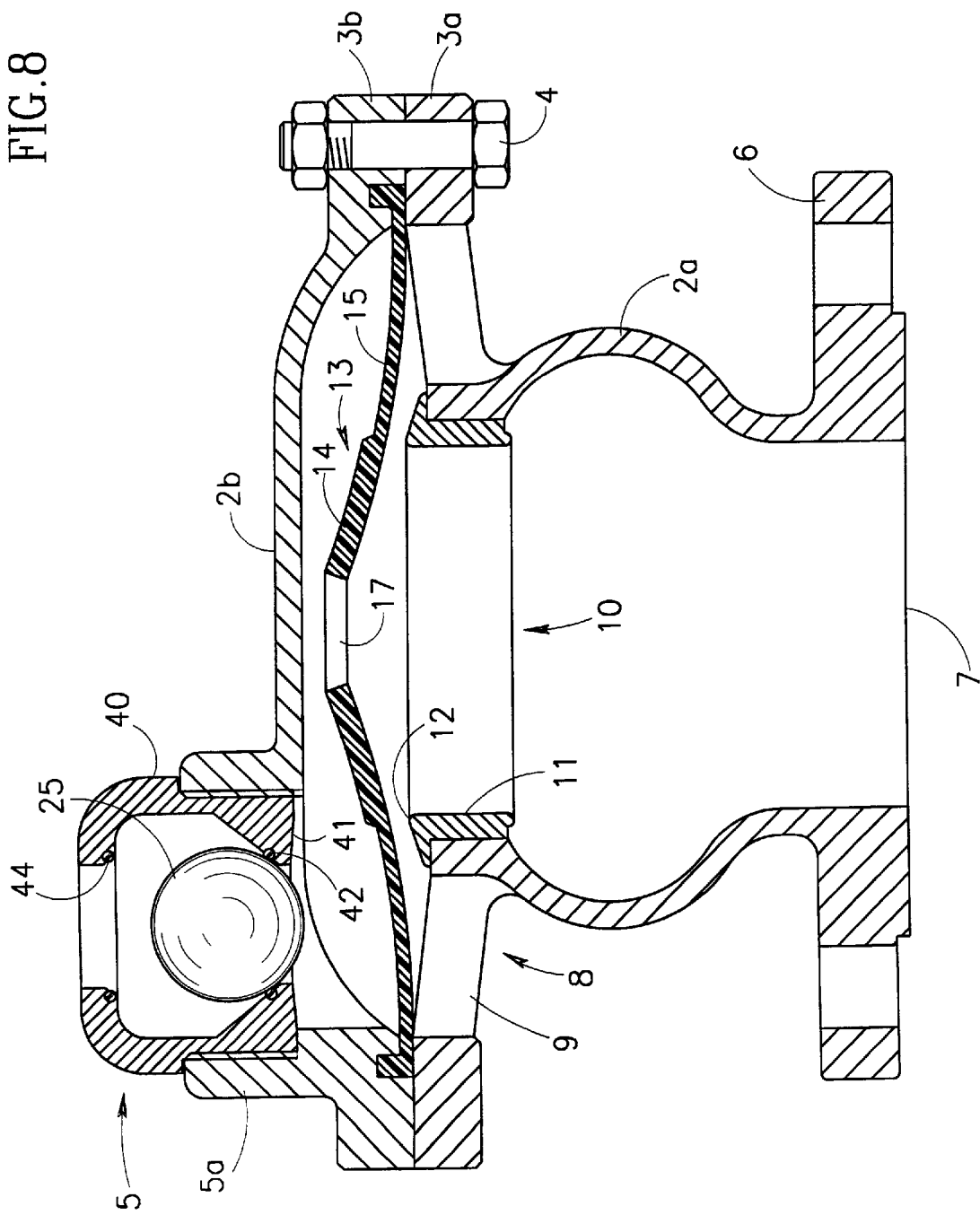
FIG. 8 is a longitudinally sectioned elevation of a combined gas purge and system drainage valve in accordance with the invention shown when the valve is open to allow for rapid air inflow into a system being drained.

FIG. 8 illustrates an embodiment of an air purge valve which, in addition to performing its usual function of ensuring discharge of air from the system, also ensures that, upon drainage of the system, inflow of air into the valve takes place so as to prevent the generation of a dangerous sub-atmospheric pressure in the valve with consequent danger of collapse.

The valve construction as shown in FIG. 8 is essentially the same as that shown in FIGS. 1, 2 and 3, with the difference that in this case a minor valve outlet casing 40 having an inwardly directed peripheral flange 41 is provided with a sealing ring 42 (constituting a second float seating) so that, when the spherical float 25 seats against this sealing ring 42, inflow of air into the valve housing through the minor valve outlet 5 is prevented. As before, however, the valve housing is provided at its uppermost end with a sealing ring 44 (constituting a first float seating) so that, when the spherical float 25 bears against this sealing ring 44 (as a result of the entry of liquid into the valve housing), the float 25 prevents liquid from flowing out of the housing.

The use of this modified air purge valve to ensure entry of air into the system upon drainage of the system, takes place as follows. Upon drainage of the system, a sub-atmospheric pressure is generated, first in the lower chamber I and then in the upper chamber II (thus air cannot enter the upper chamber II, seeing that the spherical float 25 is seated in a sealing position against the sealing ring 42). In consequence, the atmospheric pressure bearing on the under side of the flexible annular portion 15 of the diaphragm 13 through the main outlet 8 causes the diaphragm 13 to flex upwardly, as seen in FIG. 8 of the drawings, and thereby to allow for the rapid inflow of large amounts of air through this main outlet 8 into the system, as shown.

The construction of the valve as illustrated in FIG. 8 of the drawings nevertheless still allows for this valve to operate as an air purge valve, seeing that the flow of even small quantities of air into the valve housing (through the lower chamber I and via the restricted central aperture 17 into the upper chamber II) is sufficient to dislodge the spherical float 25 from its sealing position. As a consequence, air proceeds to flow out of the minor valve outlet 5 with a consequent upward flexing of the diaphragm 13, allowing for the discharge of significant quantities of air through the main valve outlet 8. As before, with the entry of liquid into the valve housing, the liquid will ensure that the spherical float 25 is sealingly pressed against the upper sealing ring 44 and the diaphragm 13 assumes its sealing position, closing the main outlet 8 and preventing the outflow of liquid therefrom.

Figure 9:
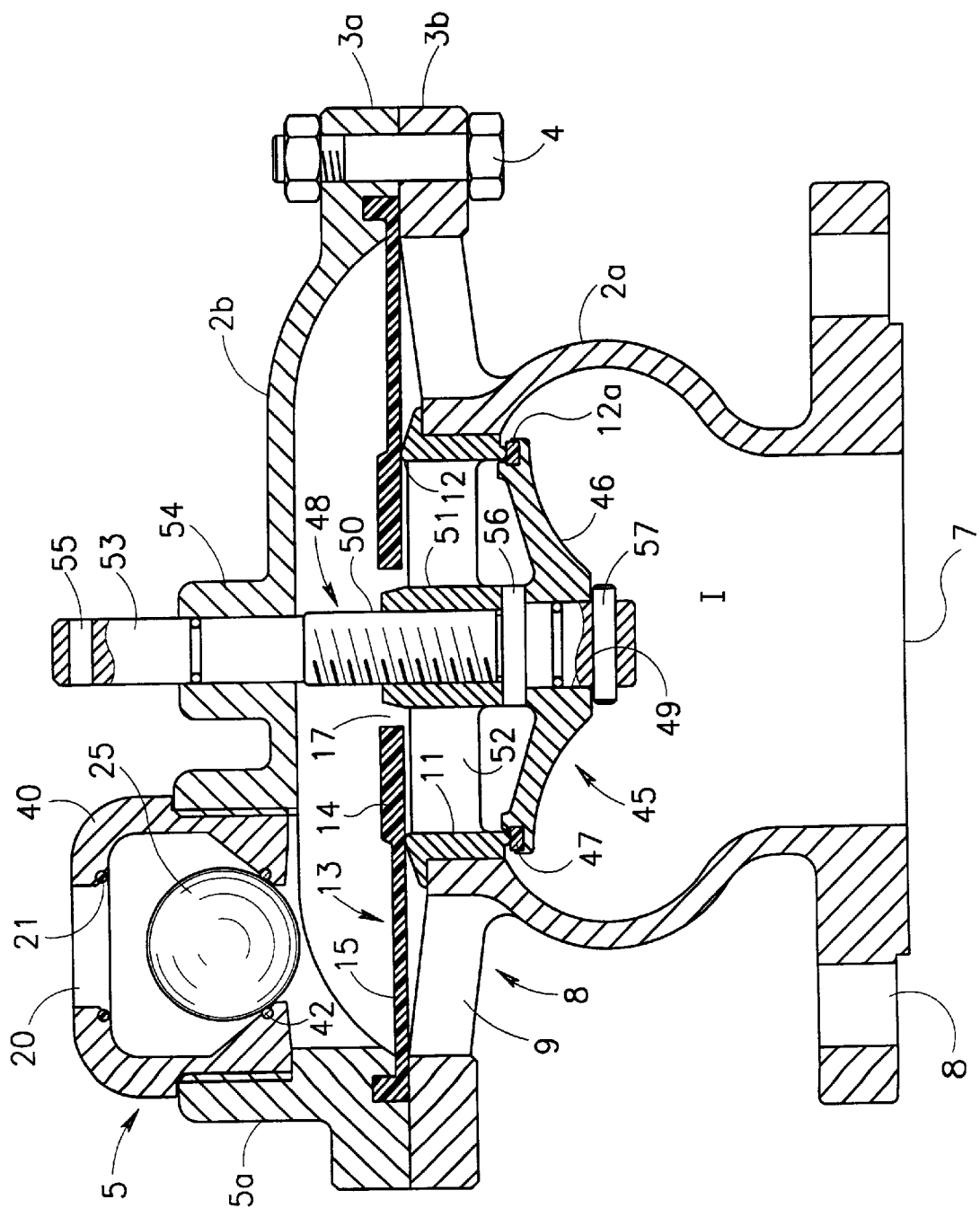
FIG. 9 is a longitudinally sectioned elevation of a modification of the valve as shown in FIG. 8, provided with means for temporarily sealing off communication between the first and second chambers for servicing purposes.

FIG. 9 shows a modification of the dual purpose valve shown in FIG. 8, wherein it is provided with means for sealing off the upper chamber II from valve inlet 7 and the lower chamber I when it is desired to service the upper component housing 2b, for example to replace the minor valve outlet casing 40. For this purpose, there is provided a valve sealing structure 45 comprising an annular sealing plate 46 provided at its periphery with a sealing ring 47 adapted to bear on the lower valve seating 12a. There is located within the central cylindrical throughflow port 10 a cylindrical insert 11 which, in addition to its upper valve seating 12 is also formed with a lower valve seating 12a. One end of a displacing rod 48 is rotatably journalled in a central throughgoing bore 49 formed in the sealing plate 46. The rod 48 is formed with an intermediate threaded portion 50 which is screw-coupled in an internally threaded tubular boss 51 which, in its turn, is fixedly mounted with respect to the cylindrical insert 11 by means of radial mounting ribs 52. An upper and opposite end 53 of the rod 48 extends slidably and sealingly through a boss 54 formed in the upper component housing 2b and is apertured at its upper extremity 55 so as to allow for the insertion of a turning handle (not shown). The sealing plate 46 and the displacing rod 48 are held in fixed axial relationship by means of an annular shoulder 56 forming an integral part of the displacing rod 48 and which bears at an upper rim of the bore 49 and a transverse positioning pin 57 which extends through a transverse bore of the rod 48 and which bears against a lower rim of the bore 49.

Rotation of the displacing rod 48 in one sense results in bringing the sealing plate 46 into sealing juxtaposition with the lower valve seating 12a of the cylindrical insert 11, thereby sealing off the inlet 7 and lower chamber I from the rest of the valve structure which can be serviced. When, however, it is desired to operate the system normally, the rod 48 is rotated in the opposite sense, thereby displacing the sealing plate 46 from the lower valve seating 12a, and thereby allowing for free flow of air and/or liquid from the inlet 7 through the aperture 17 formed in the diaphragm 13.

Figure 10:
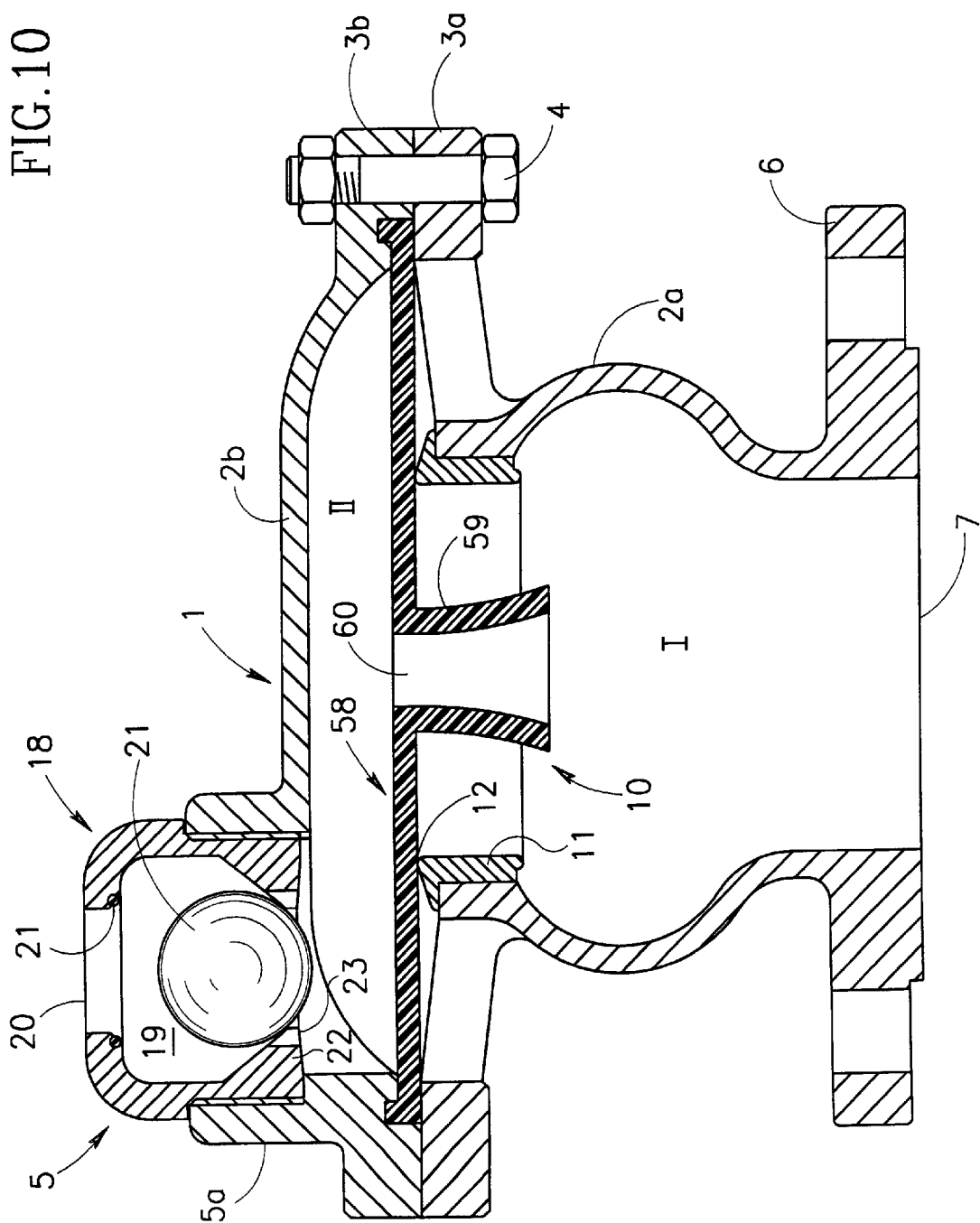
FIGS. 10, 11 and 12 show longitudinally sectioned elevations of respective modifications of the valves shown in the preceding figures, particularly in respect of the construction of the diaphragms thereof.

Referring to FIG. 10, a diaphragm 58, which here is shown as being of uniform thickness, having a flat upper surface, is formed with a downwardly-extending, outwardly flaring, tubular skirt 59 which communicates at its upper end with a central, throughgoing aperture 60 formed in the diaphragm 58, the lower end of the tubular skirt 59 extending into the interior of the lower chamber I.

By virtue of the provision of this downwardly-extending tubular skirt 59, the diaphragm 58 experiences a relatively high pressure differential between the relatively low pressure in the upper chamber II and the relatively high pressure at a downstream region in the lower chamber I, thereby allowing for an effective upward flexing of the diaphragm 58 and thereby ensuring an effective opening of the main outlet 8.

The fact that the upper surface of the diaphragm 58 is substantially uniformly planar, ensures that residual liquid does not remain on the upper surface of the diaphragm 31 after all liquid has receded from the valve, and this aids in the efficient working of the minor outlet valve. Alternatively, the mounting and form of the diaphragm can be such as to ensure effective drainage of liquid from the diaphragm.

Figure 11:
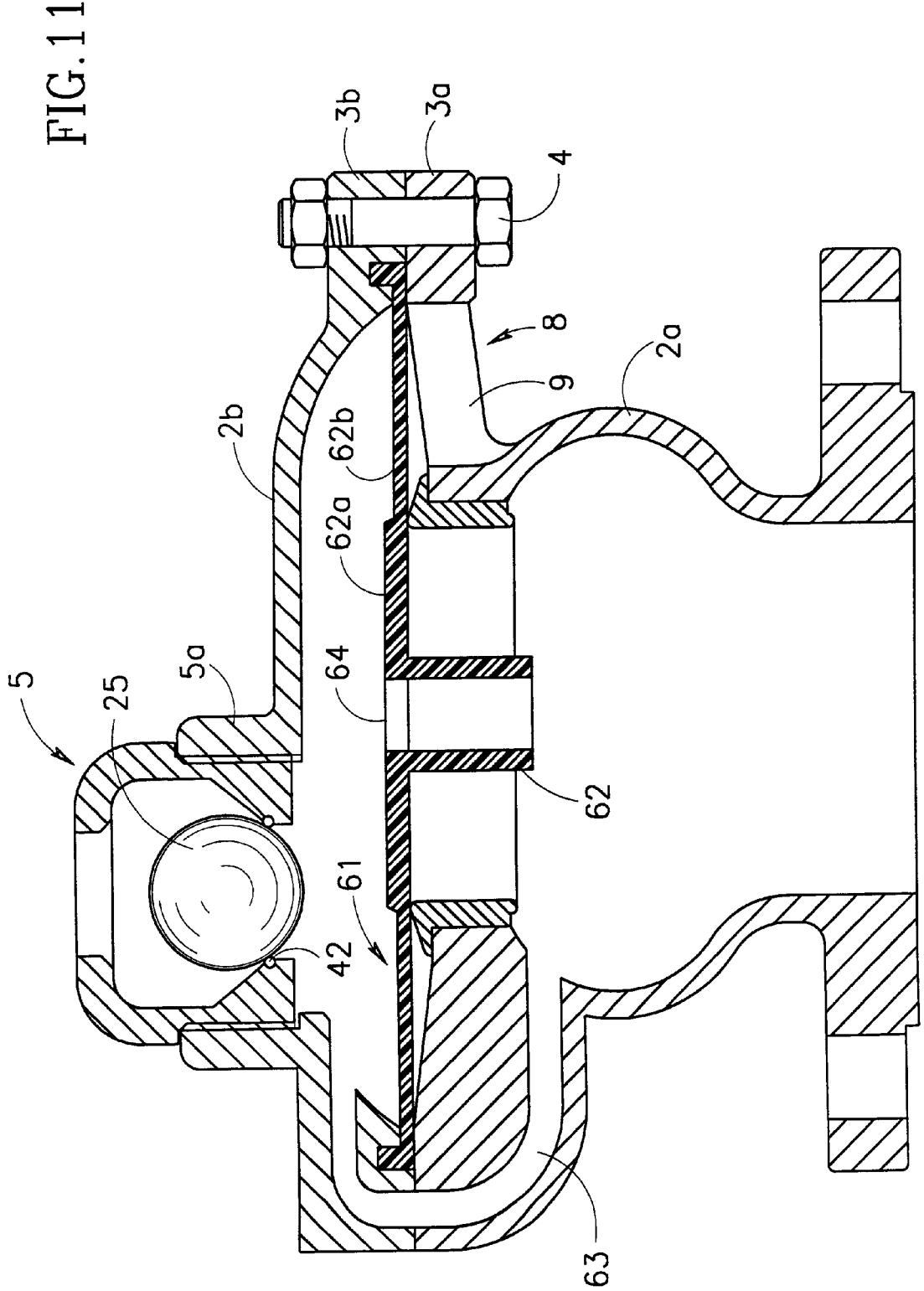

FIG. 11 also shows an air purge valve wherein a diaphragm 61 is formed with a downwardly-extending tubular skirt 62 for the same reason as that indicated above. In this case, however, the tubular skirt 62 is of uniform diameter. Furthermore, the diaphragm 62 is formed with a central, relatively rigid central portion 62a and a surrounding, more flexible annular portion 62b, as is the diaphragm shown inter alia in FIGS. 1, 2 and 3 of the drawings.

However, in the embodiment shown in FIG. 11, the valve housing is formed with a separate flow channel 63 which effects communication between the lower chamber I and the upper chamber II, in addition to the communication effected through the diaphragm aperture 64. The total communication between the chambers I and II is restricted, the total throughflow rate of both the channel 63 and the aperture 64 being less than that of the minor valve outlet 5.

Alternatively, the valve can be formed with a non-apertured diaphragm, the channel 63 serving as the sole means of flow communication between the two chambers.

Figure 12:
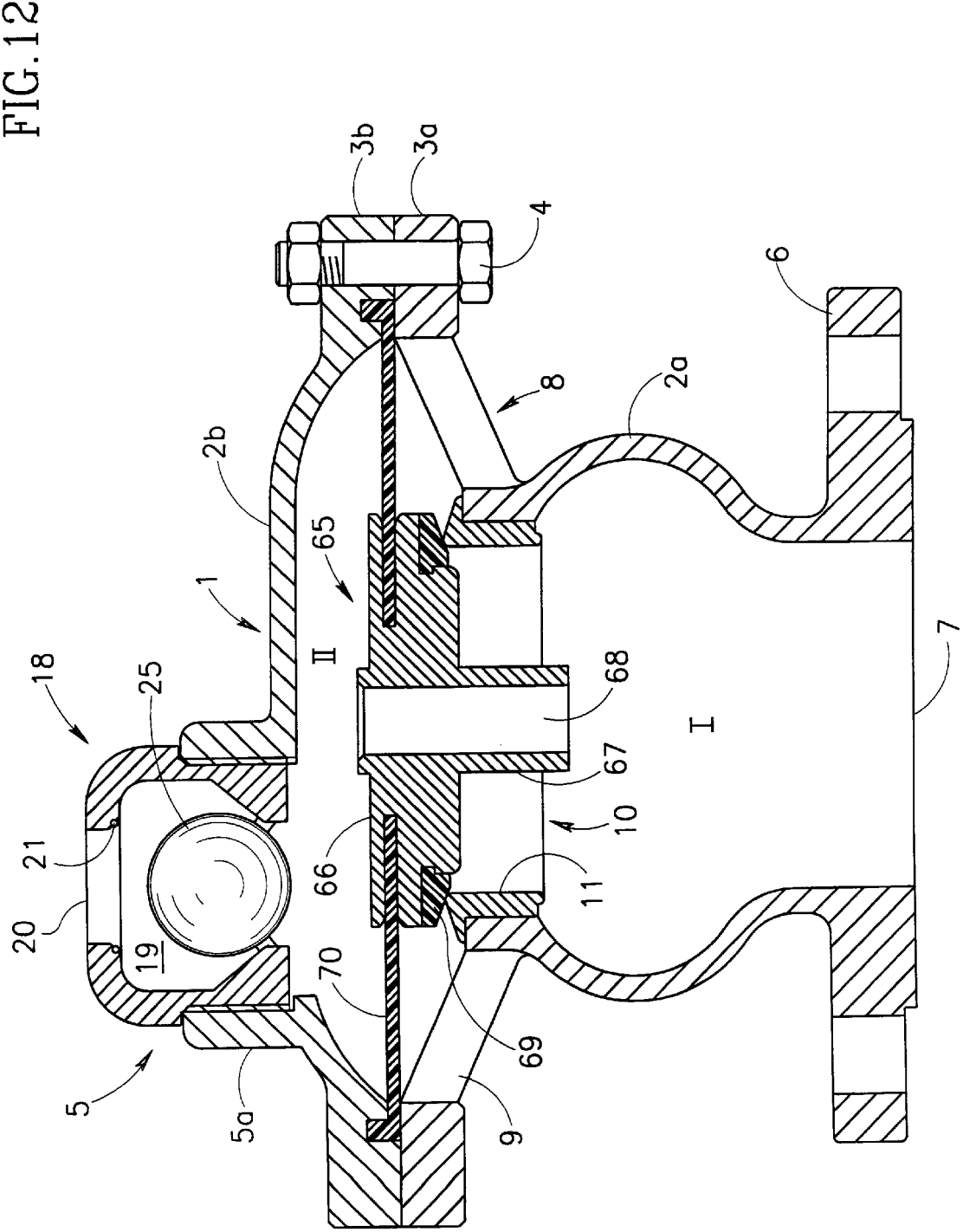

In the embodiment of the air purge valve shown in FIG. 12 of the drawings, a valve partition member 65 serving to divide the valve housing 2 into lower and upper chambers I and II is formed of a central, rigid annular portion 66 formed with a downwardly extending tubular skirt 67 having a throughgoing bore 68 serving to effect communication between the upper and lower chambers, and formed with an annular sealing ring 69 adapted to be juxtaposed sealingly on the cylindrical insert seating 11. The central, rigid portion 66 is secured to and surrounded by a flexible diaphragm 70 which, as in the previous embodiments, is clamped at its outermost periphery between the component housings 2a and 2b.

Figure 13:
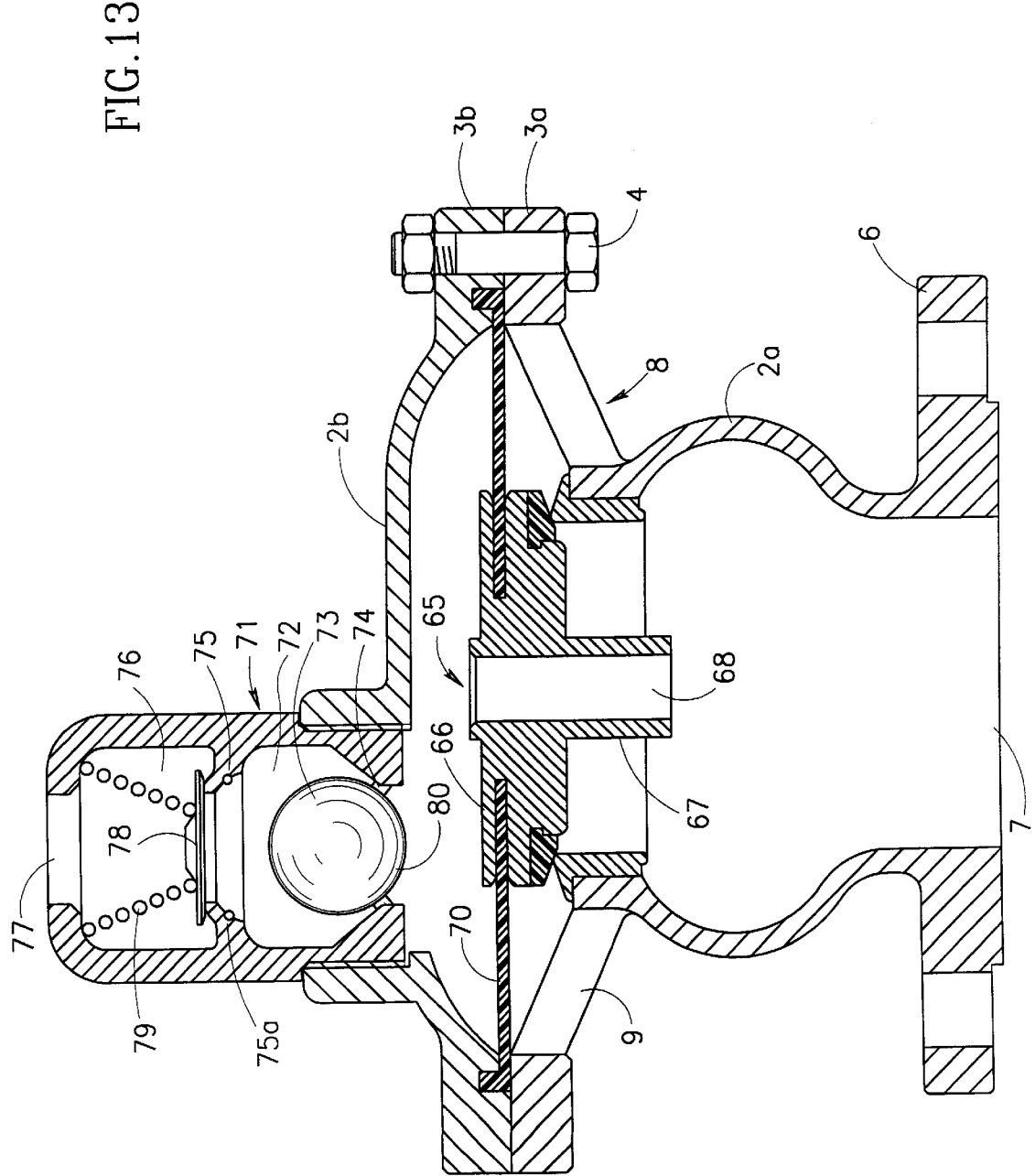
FIG. 13 is a longitudinally sectioned elevation of a still further modification of the valves shown in the preceding drawings, particularly in respect of the minor valve outlet structure.

The valve construction shown in FIG. 13 of the drawings allows, as does the valve construction shown in FIG. 8, for the use of the valve, on the one hand, as an air purge valve and, on the other hand, as a valve designed to allow for the inflow of air into the system upon drainage thereof.

To this end, the valve, whose construction, especially its diaphragm construction, is similar to that illustrated in FIG. 12 of the drawings, is provided with a minor outlet valve casing 71 having a lower region 72 in which is located a spherical float 73 which, in the absence of liquid tending to move it upwards, rests on radial ribs or studs 74, thereby allowing for airflow into this lower region 72 from the upper chamber II. Formed at an intermediate region of this minor valve housing 71 is an upper seating 75 adapted to receive the spherical float 73 when it is forced into an uppermost position against a sealing ring 75a due to the presence of liquid, in which position the float 73 seats sealingly against the seating 75, preventing the outflow of liquid.

The minor valve housing 71 is furthermore provided, in an upper region 76 thereof, with a valve outlet port 77 and a sealing disc 78 which, as shown in FIG. 13 of the drawings, is biased by means of a compression spring 79 against the seating 75.

Thus, in operation, when the valve is used as an air purge valve, air can pass out of the minor valve casing 71, through a lowermost inlet 80 thereof, passing out of the minor valve outlet port 77 by displacing the sealing disc 78 upwardly against the relatively low, oppositely-directed biasing pressure exerted by the spring 79.

Where, however, the valve is to function in order to allow the inflow of air into the system during drainage, the presence of the sealing disc 78 biased against the seating 75 clearly prevents inflow of air into the system via the minor outlet valve casing 71 and, under those circumstances, and similar to the situation as described with reference to FIG. 8 of the drawings, the diaphragm 70 flexes upwardly, allowing for the inflow of air through the major valve outlet 8 into the system.

Figure 14:
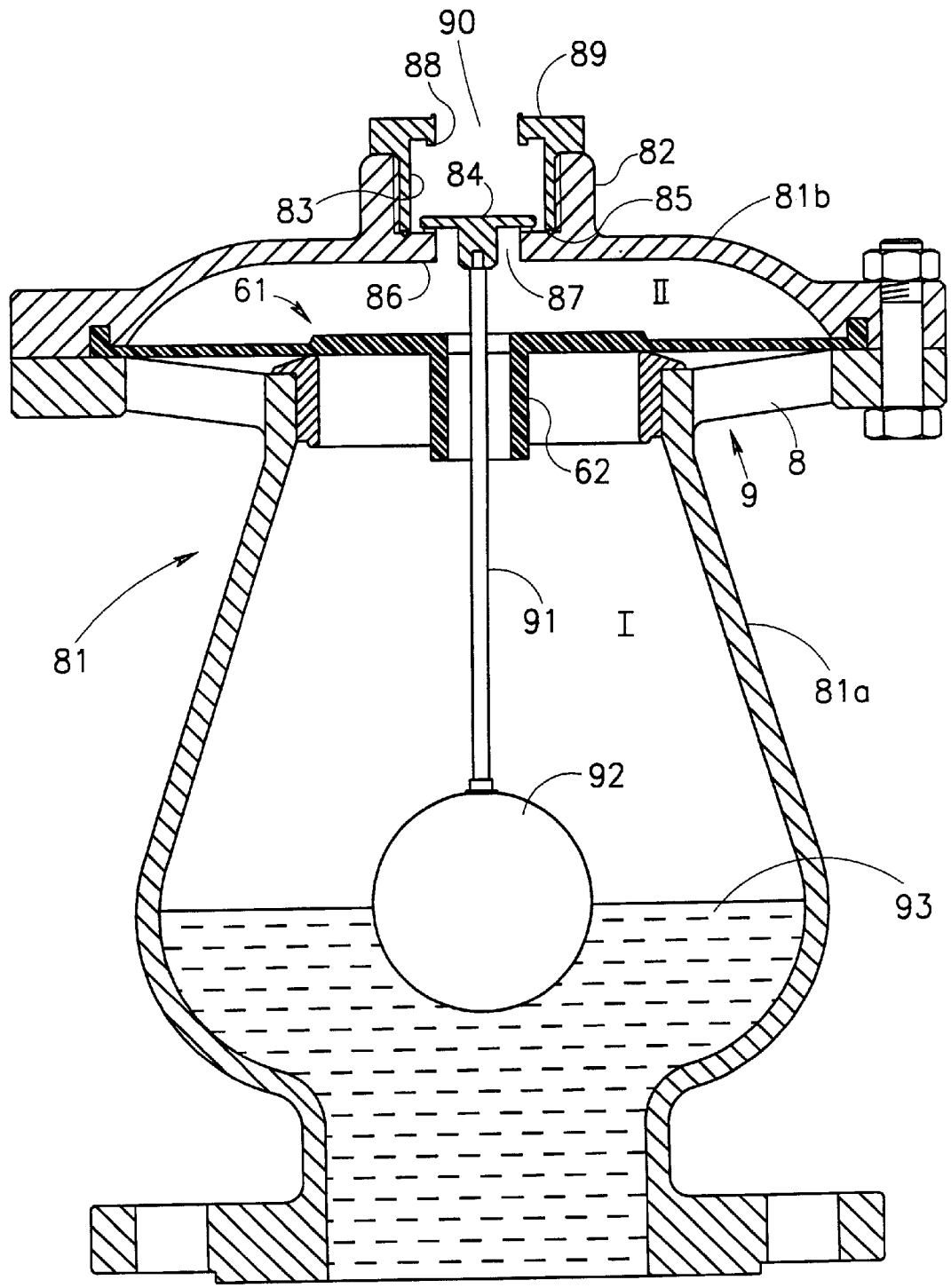
FIGS. 14 and 15 are respective longitudinally sectioned elevations of two forms of gas purge valves in accordance with the invention, particularly for use with sewage flow systems.
Figure 15:
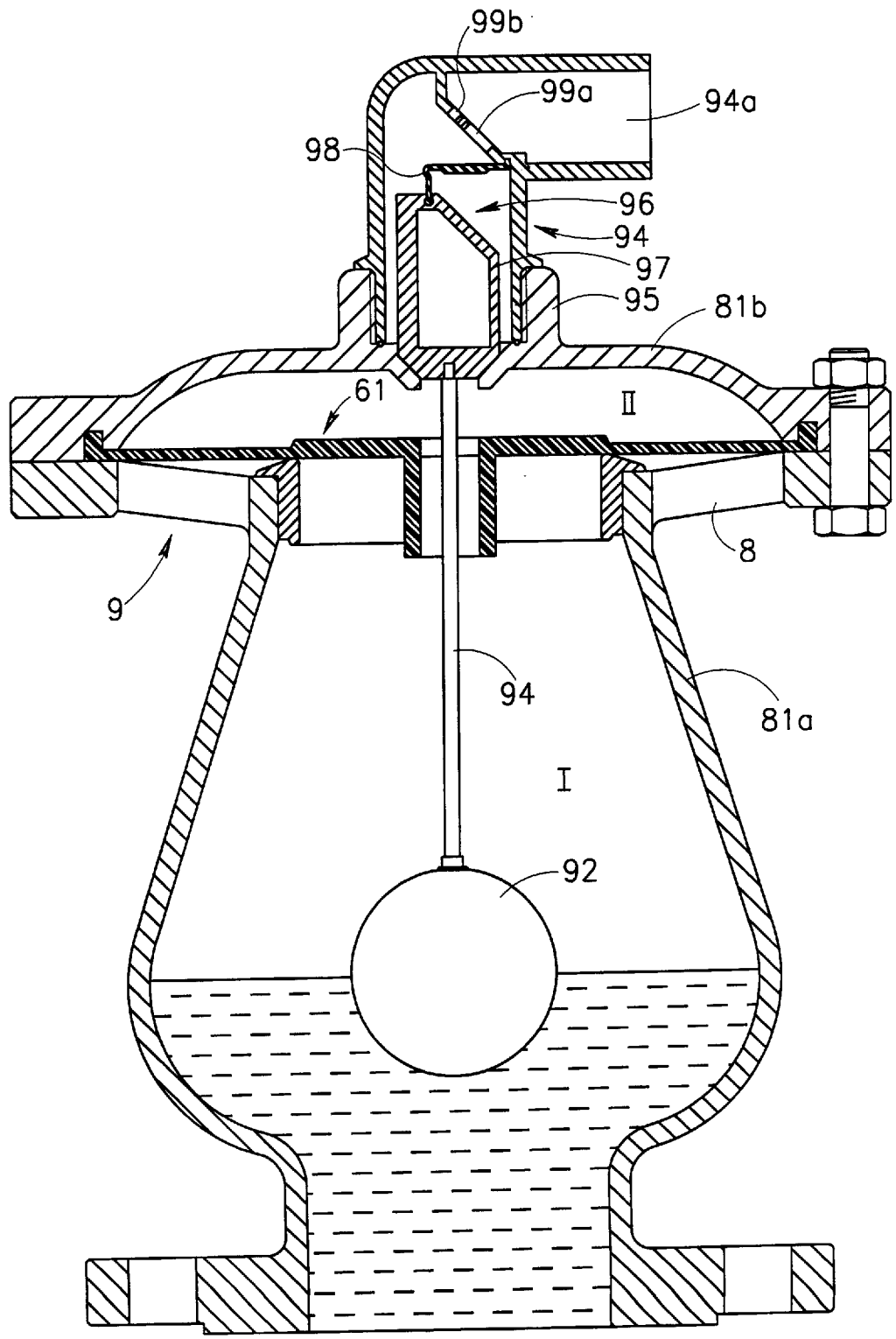

Referring now to FIGS. 14 and 15 of the drawings, there are here illustrated modifications of the air purge valve previously described, particularly for use with sewage flow systems. With such systems, it is of particular importance that effective air/gas purging should be carried out, but at the same time it must be ensured that there are minimal dangers of sewage outflow through the main valve outlet 8. To this end, in the embodiments to be described with reference to FIGS. 14 and 15, means are employed for ensuring the rapid closure of the outlet 8 once there is a rise of the sewage level in Chamber I of the valve.

In the embodiment shown in FIG. 14 of the drawings, the valve is essentially similar in construction to those described previously, and comprises a valve housing 81 comprising lower and upper component housings 81a and 81b, the former defining a lower chamber I of extended dimensions and depth. The upper component housing 81b is formed with an internally screw-threaded boss 82 in which is fitted a modified minor outlet valve casing 83. A sealing disc 84 is located in the casing 83 and bears, via a set of lower, radially spaced-apart studs 85, on a peripheral flange 86 surrounding an outlet 87 formed in the upper wall of the component housing 81b. In its uppermost position, the sealing disc 84 is adapted to bear sealingly against a seating 88 formed on the underside of a peripheral flange 89 of the enclosure 83 which surrounds minor valve outlet 90.

The sealing disc 84 is coupled by means of an extended coupling rod 91 which passes through the second chamber II via the apertured diaphragm 61 so as to be coupled to a float 92 which is shown floating on the liquid sewage 93.

As with the purge valves previously described, small quantities of gas pass out of the lower chamber I into the upper chamber II, and are vented via the spacing in the minor valve housing 83 between the sealing disc 84 and the juxtaposed flange 86. The continued flow of gas in relatively large quantities, and its venting through the minor valve outlet 90, gives rise, as before, to the development of a pressure differential between the two chambers I and II and the consequent upward flexing of the diaphragm 61, with the resulting effective gas purging via the main valve outlet 8.

The entry of liquid sewage 93 into the first chamber I of the purge valve causes the upward displacement of the float 92 and, ultimately, the upward displacement of the sealing disc 84 into sealing contact in its uppermost position with the seating 88 of the flange 89 of the minor valve housing enclosure 83. With the closure of the minor valve outlet 90, the continued rise of liquid sewage 93 increases the gas pressure in the upper chamber II, with the consequent downward flexing of the diaphragm 61 into sealing the main valve outlet 8. In this way, both the minor and main valve outlets 90 and 8 are effectively sealed against outflow of liquid sewage 93 long before the latter has reached the regions of these outlets.

The purge valve illustrated with reference to FIG. 15 of the drawings is constructed and operates in the same way, with the difference that a modified minor valve enclosure 94 is screw coupled to an internally threaded boss 95 extending from the upper wall of the component housing 81b, and has located therein a valve structure 96 of the kind described in U.S. Pat. No. 4,770,201. This valve 96 essentially consists of the valve enclosure 94 defining a minor valve outlet 94a, and within which is located a float 97 of the kind described in the earlier U.S. patent, coupled to a flexible membrane 98 which, upon upward displacement of the float 97, progressively seals large and small valve outlets 99a and 99b and, upon downward displacement of the float, progressively unseals these outlets (all as described in the prior U.S. patent specification).

Here again, the release of initial small quantities of gas takes place from the minor valve outlet 94a and major quantities of gas are released through the major valve outlet 8, which has been opened as a result of the upward flexing of the diaphragm 61.

The rise of liquid sewage 93 in the valve gives rise to the upward displacement of the float 92, and the progressive sealing of the outlet apertures 99a and 99b of the minor valve outlet 94a, resulting in a progressive rise in pressure in the second chamber II and the consequent downward flexing and sealing of the diaphragm 61 so as to close the main valve outlet 8 from throughflow of sewage.

In a modification of the valves previously described, means are provided for indicating when the valve is closed to outflow of liquid, e.g. in the embodiments shown in FIGS. 1 to 15 of the drawings the float can be formed with an indicator rod which projects from the minor valve outlet when the float is upwardly displaced to seal the outlet against outflow of liquid.

Similarly, the diaphragm can be provided with an indicator rod which can project from a suitable opening in the upper component housing when the diaphragm is upwardly displaced so as to open the major valve outlet. In this way, a visual indication of the opening of the major valve outlet is available.

I claim:

1. A gas purge valve comprising:
   a valve housing having a valve inlet and major and minor valve outlets;
   a valve partition member mounted in said housing and serving to divide said housing into a first chamber communicating with said valve inlet and a second chamber communicating with said minor valve outlet;
   a restricted flow passage defined in said housing serving to effect communication between said first and second chambers and having a throughflow rate less than that of said minor valve outlet;
   a minor valve closure device comprising a seating defining a throughflow port open to the atmosphere, and a float member displaceable susceptive to a fluid for sealing said throughflow port to liquid outflow;
   differential pressure responsive means mounted in said partition member and displaceable in response to a pressure differential between said chambers, and
   a major valve outlet obturating means responsive to displacement of said differential pressure responsive means into opening said major valve outlet when said pressure differential exceeds a predetermined magnitude.

2. A gas purge valve according to claim 1, wherein said valve partition member comprises a diaphragm flexibly mounted in said housing, at least a portion of said diaphragm constituting said differential pressure responsive means.

3. A gas purge valve according to claim 1 and comprising a major valve outlet seating; said diaphragm serving as said obturating means is juxtaposed with respect to said seating so as to bear normally against it, thereby sealing said outlet and so as to be flexibly displaceable away from said seating so as to open said outlet.

4. A gas purge valve according to claim 3, wherein there is formed in said diaphragm a throughgoing aperture constituting said flow passage.

5. A gas purge valve according to claim 4, and furthermore comprising biasing means for biasing said diaphragm against said major valve outlet seating.

6. A gas purge valve according to claim 5, wherein said biasing means comprises a compression spring which bears at one end thereof on said diaphragm and, at the other end thereof, on said valve housing.

7. A gas purge valve according to claim 5, wherein said biasing means comprises diaphragm mounting means serving to pre-tension said diaphragm.

8. A gas purge valve according to claim 5, wherein there is furthermore provided an aperture regulating stem mounted in said housing and projecting into said diaphragm aperture and having a cross-sectional area which reduces in an axial direction away from said diaphragm such that, upon flexible displacement towards said seating the lateral throughflow dimensions of said aperture gradually decrease.

9. A gas purge valve according to claim 8, wherein stem displacing means are provided actuatable from outside the valve housing for axially displacing the stem through said aperture.

10. A gas purge valve according to claim 4, wherein said diaphragm is formed integrally with a tubular skirt, one end of which extends from the diaphragm aperture and an opposite end of which extends into said first chamber.

11. A gas purge valve according to claim 4, wherein said diaphragm is constituted by a central, relatively rigid portion in which is formed said aperture and an outer, annular resiliently flexible portion fixedly clamped in said housing.

12. A gas purge valve according to claim 11, wherein an upper surface of said diaphragm is substantially planar.

13. A gas purge valve according to claim 3, wherein there is defined in said housing a throughflow channel constituting said restricted flow passage.

14. A gas purge valve according to claim 1, wherein said minor valve outlet comprises an outlet casing mounted on said housing and accommodating said float member; first and second float seating formed in said casing, said first float seating defining said throughflow port opening to the atmosphere and a second throughflow port continuously open to said second chamber, at least said first float seating being such that when said float bears against it, said defined throughflow port is sealed against fluid throughflow from the said second throughflow port via said casing.

15. A gas purge valve according to claim 14, wherein said second float seating is such that when said float bears against it, there is defined between them throughflow passages.

16. A gas purge valve according to claim 15, wherein said outlet casing comprises first and second superimposed compartments, said first and second float seatings and first and second throughflow ports being formed in said first compartment, said second compartment being formed with a further throughflow port, a sealing disc located in said second compartment and biasing means for slightly biasing said sealing disc against said first seating, the arrangement being such that gas flow through said first compartment from said second throughflow port overcomes said biasing means so as to emerge from said further outflow port.

17. A gas purge valve comprising first and second valve housing components rigidly secured at peripheral flange portions thereof to form a valve housing; a diaphragm having a central, relatively rigid portion and an outer, relatively resilient annular portion clamped between said peripheral flange portions and defining, with said first and second valve housing components, first and second chambers; a valve inlet and a major valve outlet formed in said first housing component and communicating with said first chamber; a minor valve outlet formed in said second housing component and communicating with said second chamber; a throughgoing aperture being formed in said relatively rigid portion and constituting a flow passage between said first and second chambers having a throughflow rate less than that of said minor valve outlet; said diaphragm being juxtaposed with respect to said major valve outlet so as to bear normally into sealing it and to be flexibly displaceable away from it so as to open said major valve outlet; a minor valve outlet casing forming part of said minor valve outlet and mounted on said second valve housing component; a float located in said outlet casing; first and second float seatings formed in said casing respectively defining first and second throughflow ports respectively opening to the atmosphere and to said second chamber; at least said first float seating being such that when said float bears against it, its associated throughflow port is sealed against fluid throughflow from the other throughflow port via said casing.

18. A gas purge valve according to claim 17, wherein said first chamber is formed with a central throughflow port opposite said valve inlet having upper and lower annular valve seatings, said relatively rigid diaphragm being normally seated on said upper annular seating; there being furthermore provided an annular sealing plate located in said first chamber and plate displacing means actuatable from outside the housing so as to displace said sealing plate towards and away from said lower annular seating, the arrangement being such that when said sealing plate is seated against said lower annular seating, throughflow from said first to said second chambers is prevented.

19. A gas purge valve for use in a sewage flow system and comprising a valve housing having a valve inlet and major and minor valve outlets; a diaphragm flexibly mounted in said housing and juxtaposed with respect to said major valve outlet so as to bear normally against it to seal it and so as to be flexibly displaceable away from it so as to open it; said diaphragm serving to divide said housing into a first chamber communicating with said valve inlet and said major valve outlet and a second chamber communicating with said minor valve outlet; a throughgoing aperture being formed in said aperture and constituting a flow passage between said chambers having a throughflow rate less than that of said minor valve outlet; an outlet casing forming part of said minor valve outlet and mounted on said second valve housing component; first and second casing seatings respectively opening to the atmosphere and to said second chamber; a sealing member located in said casing and displaceable between a first position wherein it bears on said second seating so as to allow gas flow from said second chamber through said casing to the atmosphere, and a second position wherein the casing is sealed against fluid throughflow from said chamber; a float member located in said first chamber and adapted to float on liquid sewage therein and a coupling rod serving to couple said float member to said sealing member and serving to transmit upward and downward displacements of said float member to said sealing member so as respectively to close and open said minor valve outlet.

\* \* \* \* \*